Patented Jan. 14, 1936

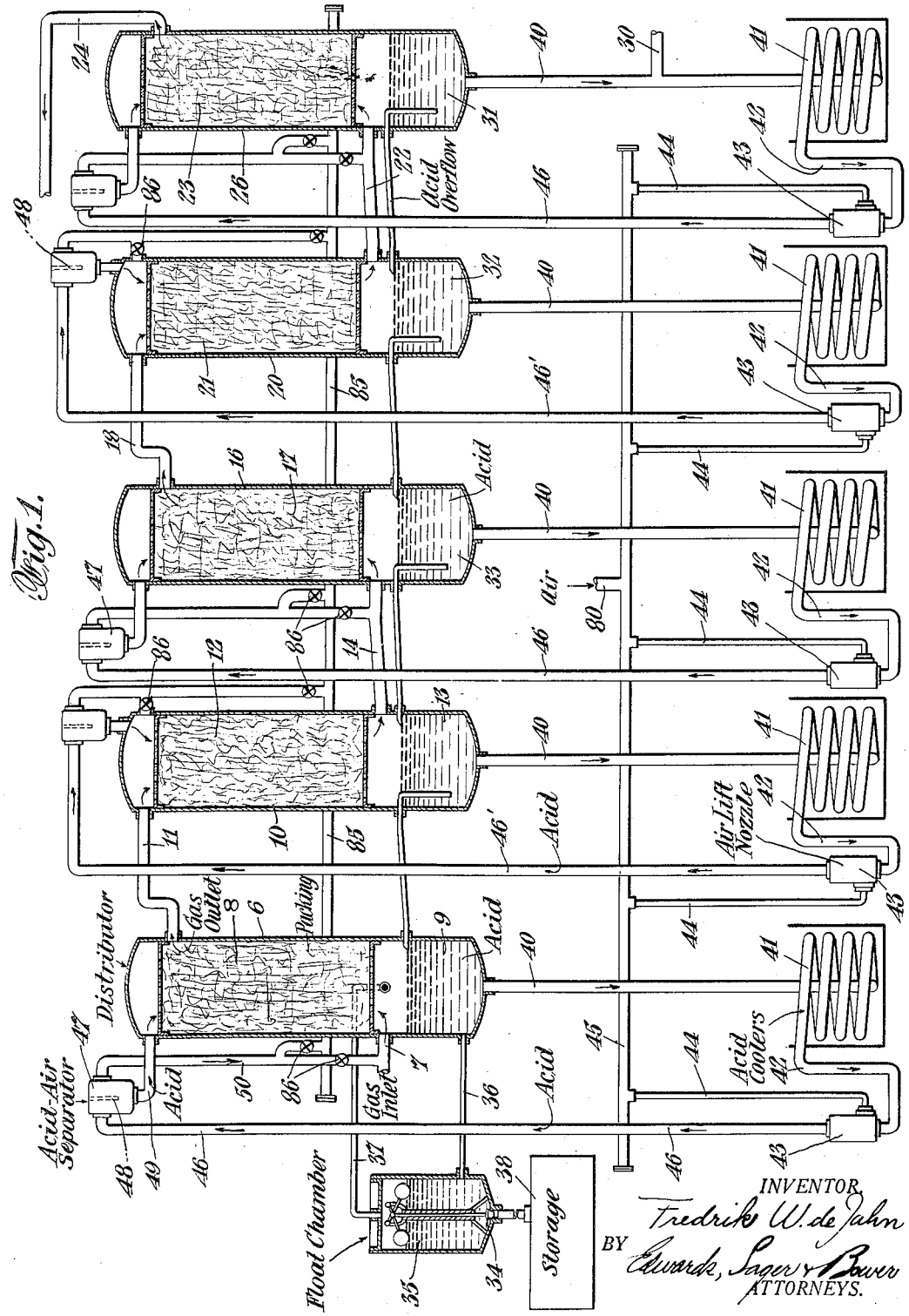

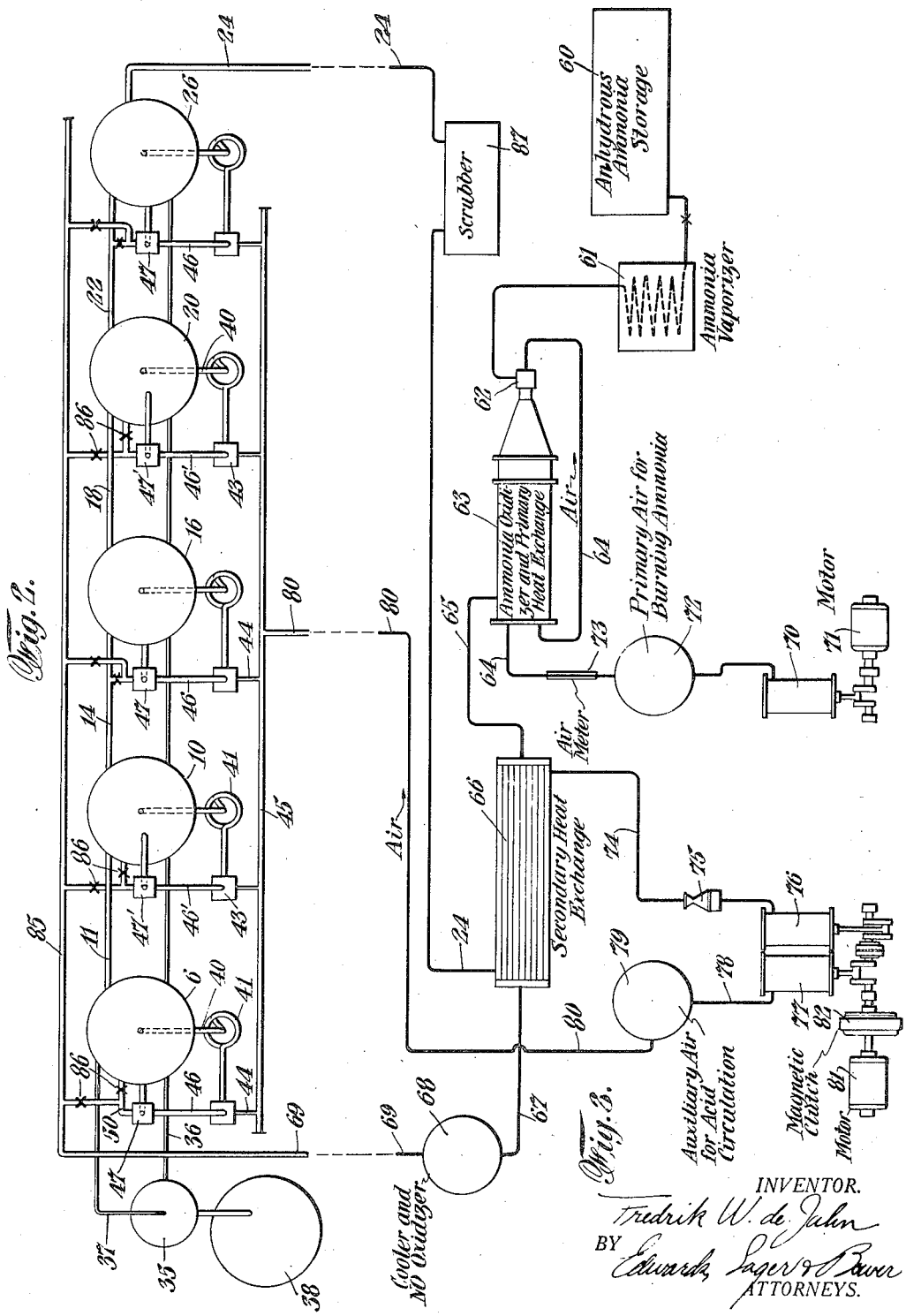

2,027,578

UNITED STATES PATENT OFFICE 2,027,578

SYSTEM FOR MANUFACTURE OF NITRIC ACID

Fredrik W. de Jahn, New York, N. Y., assignor to Frank A. Bower, Bayside, N. Y.

Application February 2, 1928, Serial No. 251,247

11 Claims. (Cl. 23—160)

This invention relates to the manufacture of nitric acid and particularly to such manufacture wherein oxides of nitrogen will pass through absorption chambers containing water to absorb the oxides and form the acid.

The object of my invention is to provide apparatus which will be simple and inexpensive to install and operate and small in size and durable in service.

Further objects of the invention particularly in the provision of apparatus for carrying on the absorption of the nitrogen gases under relatively high pressures will appear from the following description taken in connection with the accompanying drawings in which Fig. 1 is a diagrammatic elevational view with parts in section showing the absorption chambers and their connections.

Fig. 2 is a diagrammatic plan view corresponding to Fig. 1, and

Fig. 3 is a diagrammatic plan view showing the remaining portions of the system.

In the system shown in the drawings the gases containing the nitrogen oxides enter the first absorption chamber or tank 6 through the inlet 7, said gases being under a relatively high pressure of about seven atmospheres for instance, which pressure is maintained on these gases throughout the whole series of absorption chambers. These gases circulate upward through the packing 8 in contact with the liquid acid which is trickling down through the packing and are partially absorbed by this acid which accumulates in the lower reservoir 9. The unabsorbed gases pass out through to the next absorption tank 10 through the connection 11 and pass downwardly through the packing 12 where there is a further absorption by the acid passing down through this packing and accumulating in the lower reservoir 13. The unabsorbed gases from the chamber 10 pass out through the connection 14 to the tank 16 and upward through the packing 17 wherein a further absorption takes place, the unabsorbed gases passing out through the connection 18 to the tank 20 and down through the packing 21 for further absorption and then through the connection 22 to the tank 26 and up through the packing 23 where the final absorption takes place so that the gases passing out through the outlet 24 are substantially free from nitrogen oxides.

Throughout the whole of this absorption system the gases are under relatively high pressure of one hundred pounds per square inch and this enables the absorption of these gases to be carried on with the utmost efficiency within a very small space amounting approximately to one-eighth of the space that would be required for absorption at a pressure substantially atmospheric.

The water supply for the formation of the acid is fed into the circulation of the final absorption tank 26 at 30 and the resulting acid accumulating in the lower reservoir 31 of this tank overflows into the reservoir 32 of the previous tank 20 and from there into the reservoir of the previous tank 33 and so on into the reservoirs 13 and 9, the acid in each tank being of course stronger due to the accumulated absorption of the nitrogen oxide gases. A substantially constant level is maintained in the final acid reservoir 9 by the valve 34 of the float chamber 35 connected to the reservoir 9 by the lower piping 36 and the upper piping 37 so that the acid as it accumulates is delivered to the final draw off container 38.

Each absorption chamber 6, 10, 16, 20, 26 is a separate unit having its own circulatory system for circulating and re-circulating the acid through the chamber. Each of these systems comprises a pipe 40 leading downward from the corresponding reservoir and where cooling is desired cooling coil 41 is preferably placed at the lower end of this pipe. The acid is then led through the pipe 42 to an air lift 43 supplied with air under pressure from the pipe 44 tapped off from the header piping 45. The action of this air lift is to drive the acid upward in the vertical pipe 46, 46', the parts being so proportioned that the head of the acid between the reservoir level and the air lift is greater than the back pressure of the acid in this vertical pipe 46, 46'. Consequently a circulation of the acid is created in the direction indicated by the arrows. Whereas in connection with tanks 6, 16, 26 the gas inlet is at the lower portion of the tank a separator 47 is provided at the top of the pipe 46 said separator having a central baffle 48 so that the air in the mixture passing upward through the pipe 46 is separated into a liquid acid passing into the tank through the pipe 49 and air passing down through pipe 50 through the main gas inlet 7, 14, 22. The intermediate tanks 10, 20 receive the gas at their upper portions and their pipes 46' lead directly into the upper parts of the tanks without the necessity of separating the acid from the air.

The supply of nitrogen oxides may be provided from any desired source but preferably as indicated in Fig. 3 the source of these gases will be provided by the oxidation of ammonia gas.

Anhydrous ammonia is stored in a tank 60 and passed through vaporizer 61 to a mixing nozzle 62 where it is mixed with air and burned in the container 63, the reaction being maintained for instance by a platinum gauze and the hot gases being preliminarily cooled by contact with tubes carrying the air supplied through pipes 64. The partially cooled gases from the platinum gauze pass outward through the pipe 65 to a secondary cooler 66 wherein the cold discharged gases from the absorption chambers are used to further cool the hot entering gases. From the cooler 66 the nitrogen oxide mixture passes through pipe 67 to a final cooler 68 and from there by pipe 69 to the inlet 7 of the first absorption tank 6.

The air supply for the mixing nozzle 62 is provided by pump 70 driven by motor 71 and passes through the storage tank 72 and air meter 73 to the piping 64 leading to the nozzle. Both the ammonia gas and the air are maintained under high pressures of approximately seven atmospheres and this pressure on the gases is maintained throughout the apparatus, the outlet pressure in the pipe 24 discharging from the final absorption tank 26 being slightly less due to intermediate pressure losses. This discharged gas from pipe 24 still at high pressure is carried through the scrubber 87 to remove the acid and then through the secondary heat exchange 66 where it receives heat from the entering gases and is passed on through the pipe 74 and expansion valve 75 to drive the air engine 76 which in turn drives the pump 77 furnishing auxiliary air for the air lift nozzles 43. The air under pressure from the pump 77 is passed through pipe 78 to the storage reservoir 79 and thence through pipe 80 to the distributing header 45. A motor 81 may also be connected by magnetic clutch 82 to drive the air pump 77 to start the process or whenever the discharge air is insufficient to provide the necessary power.

The auxiliary air after it is separated from the acid may be introduced all of it or part of it at one or a few points as desired or may, as previously described, be introduced into the chamber of each circulatory system in which it is used. By providing piping 85 with its valves 86 all the separated auxiliary air may be introduced at gas inlet 7 or 11 or 14 or part may be introduced at inlet 7 and the rest at inlet 11 or it may be distributed between inlets 7, 11 and 14, as may be most advantageous depending upon the percentage of nitrogen oxides in the gas and the temperature of the cooling water and the atmosphere.

By maintaining the nitrogen oxide gases under pressure in the absorption chambers the absorption of these gases is greatly facilitated so that much smaller apparatus may be used. In the system of this invention the separate absorption tanks, each with its own acid circulation, make each unit independent for inspection and replacement or repair and also give a very positive control over the absorption by control of the temperature of each tank and the circulation of acid therein. This separation of the absorption tanks is also important in permitting auxiliary air to be added to the gases at each unit so that the composition of these gases may be very closely and accurately controlled. I have found it very advantageous to add auxiliary air to the gases in steps during the absorption and in the apparatus shown the air lifts introducing this auxiliary air have been used to maintain the acid circulation and dispense with the necessity of installing pumps for this purpose.

There are therefore no packed bearings in contact with the nitrogen oxide gases and all parts may readily be made permanently leak-proof even under the high pressures used. The entire system is simplified and the apparatus reduced in size and cost with an actual gain in the efficiency of absorption and the yield of acid.

I claim:

1. In the manufacture of acid the process of passing acid gases under pressure of a number of atmospheres into a plurality of separate absorption chambers, circulating acid through each of such absorption chambers, cooling said acid and maintaining the acid in surface contact with said gases under said pressure and accumulating and drawing off the acid from said chambers.

2. In the manufacture of acid the continuous introduction of acid gases under pressure of a number of atmospheres, into a series of absorption chambers, the continuous collection of the acid formed in said absorption chambers in separate receptacles for each chamber and the cooling and continuous re-introduction of said acid into the same absorption chamber and continuous re-collection in the same receptacle and the continuous transfer of said acid from the last receptacle through the others to the first and then to a final storage chamber when the amount of acid in any one of said receptacles becomes more than a predetermined amount, all under pressure of a number of atmospheres.

3. In the manufacture of acid the continuous introduction of acid gases under pressure of a number of atmospheres into a series of absorption chambers at the top of said chambers, the continuous collecting of the acid formed in said chambers in separate receptacles at the bottom of each chamber, the lifting of said acid to the top of said absorption chambers by an air lift and the separation of the air introduced by such air lift and the continuous re-introduction of said acid into the same absorption chamber.

4. Apparatus for the manufacture of acid comprising a tank forming a reservoir for acid gases under pressure of several atmospheres, a plurality of separate absorption chambers formed to withstand said high pressures and connected to receive and pass said gases under such pressure, piping connected to the chambers at each end and acting to receive acid at one end and reintroduce it at the other end so as to maintain said acid in contact with said gases under said pressure, and sump reservoirs at the lower ends of said chambers having connections for accumulating and drawing off the acid from said chambers, said piping comprising a cooling coil for cooling said acid.

5. Apparatus for the manufacture of acid comprising a tank forming a reservoir for acid gases under pressure of several atmospheres, a plurality of separate absorption chambers formed to withstand said high pressures and adapted to receive and pass said gases under said pressure, piping connected to each chamber and adapted for circulating acid to maintain the acid in surface contact with said gases under said pressure, sump reservoirs at the lower ends of said chambers having connections for accumulating and drawing off the acid from said chambers, said piping comprising an auxiliary air injector adapted to lift a column of the acid to cause circulation thereof in said chambers, and a cooling coil for cooling said acid.

6. The combination with an acid gas absorption chamber, of apparatus for circulating acid therethrough comprising a reservoir below said chamber and a pipe leading downward therefrom, an air lift adapted to inject air into the lower portion of said pipe and lift said acid upward above the level of the acid in said reservoir and a pipe receiving the mixed acid and air from said air lift.

7. The combination with an acid gas absorption chamber, of apparatus for circulating acid therethrough comprising a reservoir below said chamber and a pipe leading downward therefrom, an air lift adapted to inject air into the lower portion of said pipe and lift said acid upward above the level of the acid in said reservoir, a pipe receiving the mixed acid and air from said air lift and a separator at the upper end of said pipe for separating the air and acid.

8. Apparatus for the manufacture of acid comprising a tank forming a reservoir for acid gases under pressure of several atmospheres, a plurality of absorption chambers adapted to receive and pass said gases under said pressure, piping leading into and out of each of said chambers for circulating acid and maintaining the acid in surface contact with said gases under said pressure, an air pump adapted to supply auxiliary air to certain of said absorption chambers, and a driving motor operating said air pump and driven by the unabsorbed exhaust gases from said chambers.

9. Apparatus for the manufacture of acid comprising a tank forming a reservoir for acid gases under pressure of several atmospheres, a plurality of absorption chambers adapted to receive and pass said gases under said pressure, piping leading into and out of each of said chambers for circulating acid and maintaining the acid in surface contact with said gases under said pressure, an air pump adapted to supply auxiliary air to certain of said absorption chambers, and a driving motor operating said air pump and driven by the unabsorbed exhaust gases from said chambers and comprising a heating apparatus adapted to circulate said exhaust gases in cooling relation to said acid gases.

10. Apparatus for the manufacture of acid comprising a tank forming a reservoir for the acid gases under pressure of several atmospheres, a plurality of separate absorption chambers adapted to receive and pass said gases under said pressure, piping separately connected to each of said chambers for circulating the acid and maintaining the acid in surface contact with said gases under said pressure, said piping comprising an auxiliary air injector adapted to lift a column of acid to cause a circulation thereof in said chamber, a separator for dividing the injected air from the acid, and connections for introducing the separated air into any desired absorption chamber.

11. Apparatus for the manufacture of acid comprising a tank forming a reservoir for acid gases under pressure of a number of atmospheres, a plurality of separate absorption chambers adapted to receive and pass said gases under said pressure, a separate system of piping for circulating and recirculating the acid in each chamber while maintaining the acid in surface contact with said gases under said pressure, a sump reservoir at the bottom of each chamber connected to said circulating piping, a cooler connected to said piping to cool said acid, an air lift operated to lift a column of said acid sufficiently to cause a circulation thereof in said chamber, a separator for dividing out said air from said acid, a connection for leading said air into the lower portion of any one or more of the absorption chambers, another connection for leading said acid into the upper portion of said respective absorption chamber, apparatus for collecting and removing said acid comprising a plurality of receptacles for each chamber, connections carrying said acid from each of said receptacles to one of the adjacent receptacles when the acid collected in the first mentioned receptacle rises above a predetermined height, an outlet in the last of said acid receptacles leading into a float chamber in which the acid is maintained at a constant level, and connected piping for automatically leading off said acid from said float chamber into a storage reservoir.

FREDRIK W. DE JAHN.